(12) United States Patent
Sannino et al.

(10) Patent No.: US 8,546,976 B2
(45) Date of Patent: Oct. 1, 2013

(54) SYSTEM AND APPARATUS FOR POWER TRANSFER TO VESSELS

(75) Inventors: Ambra Sannino, Västerås (SE);
Georgios Demetriades, Västerås (SE);
Lars Hultqvist, Västerås (SE); Ola Norén, Olso (NO)

(73) Assignee: ABB Research Ltd. (CH)

( * ) Notice: Subject to any disclaimer, the term of this patent is extended or adjusted under 35 U.S.C. 154(b) by 116 days.

(21) Appl. No.: 13/158,574

(22) Filed: Jun. 13, 2011

(65) Prior Publication Data

US 2011/0298283 A1 Dec. 8, 2011

Related U.S. Application Data

(63) Continuation of application No. PCT/EP2009/066960, filed on Dec. 11, 2009.

(60) Provisional application No. 61/121,980, filed on Dec. 12, 2008.

(51) Int. Cl.
*H02J 3/14* (2006.01)

(52) U.S. Cl.
USPC .......................................................... 307/38

(58) Field of Classification Search
None
See application file for complete search history.

(56) References Cited

U.S. PATENT DOCUMENTS

| | | | | |
|---|---|---|---|---|
| 5,790,399 | A | * | 8/1998 | Campbell ..................... 700/295 |
| 7,980,905 | B2 | * | 7/2011 | Rembach et al. ................. 440/6 |
| 2007/0114796 | A1 | | 5/2007 | Garces et al. | |

FOREIGN PATENT DOCUMENTS

| | | |
|---|---|---|
| EP | 0536876 A1 | 4/1993 |
| WO | 2006079636 A1 | 8/2006 |

OTHER PUBLICATIONS

International Preliminary Report on Patentability; PCT/EP2009/066960; Mar. 4, 2011; 8 pages.
International Search Report and Written Opinion of the International Searching Authority; PCT/EP2009/066960; Jun. 7, 2010; 10 pages.
Flottemesch, et al.; "Optimized Energy Exchange in Primary Distribution Networks with DC links"; Proceedings of the 2004 IEEE International Conference; vol. 1; Apr. 5, 2004; pp. 108-116.

* cited by examiner

*Primary Examiner* — Hal Kaplan
(74) *Attorney, Agent, or Firm* — St. Onge Steward Johnston & Reens LLC

(57) ABSTRACT

A system for supplying electric power from an AC power source to ships, each of the ships moored at a respective berth of a quay, the system including a rectifier, having an AC and DC side, for converting AC electric power from the AC power source to DC power, the AC side arranged to be connected to the AC power source, and a plurality of ship connection arrangements for supplying electric power to a respective ship, each of the ship connection arrangements placed at one of the berths and including an inverter configurable to output AC power at a first or a second frequency and a ship connector for connecting the ship. A DC distribution network connected to the DC side of the rectifier and the rectifier is placed at a distance from the quay and each of the inverters is connected to the DC distribution network is also contemplated.

20 Claims, 4 Drawing Sheets

SYSTEM AND APPARATUS FOR POWER TRANSFER TO VESSELS

CROSS-REFERENCE TO RELATED APPLICATIONS

The present application is a continuation of pending International patent application PCT/EP2009/066960 filed on Dec. 11, 2009 which designates the United States and claims the benefit under 35 U.S.C. §119(e) of the U.S. Provisional Patent Application Ser. No. 61/121,980, filed on Dec. 12, 2008, the content of which is incorporated herein by reference.

FIELD OF THE INVENTION

The invention relates a system for supplying electrical power from an AC power electrical network to an arriving ship moored at a berth of the harbour quay.

BACKGROUND OF THE INVENTION

Shore-side power supply has been used for supplying ferries with electricity. Since many ferries are typically docked in the same position at the same quay it is easy to provide a suitable connection. Today, some other types of commercial ships, such as, cruise, container, and Ro/Ro vessels are connected to the electrical grid in ports around the world.

At sea, power generation onboard of a ship is provided by a main generator coupled with a propulsion engine combined with auxiliary engines for generating power needed by the ship. The main engine(s) of the ship are usually switched off once the ship berths at a quay and auxiliary generators take control of all the power generation onboard for hotelling, unloading and loading activities. The auxiliary engines today are running on cheap and low-quality fuel, which results in negative environmental impacts. Therefore, a shore-side power supply is recommended. Moreover, if the auxiliary generators are shut down, an external power supply is needed while ships are mooring at a quay.

A problem with power supplies from shore-side to ships is that different countries use AC power transmissions at different frequencies, e.g. 60 Hz in USA and 50 Hz in European countries, and ships travel between countries. Ships commonly use either 50- or 60-Hz systems for their equipment and also require different amounts of power, which may be in the range of some hundreds of kW up to 12-15 MW for large cruise ships. Depending on types of vessel, high connection voltages, in the range of 6-11 kV, may be needed for a vessel, for example a modern cruiser.

To convert AC power supply to a selected frequency and a power level, a group of equipment, for example, a rectifier, an inverter and a transformer, has to be installed at each berth of a quay, which imposes a considerable demand on a footprint/space for the conversion of power supply and also results in interference with activities at the berth. For example, when a container ship is moored at the berth, a crane often runs a full length of a berth for loading, unloading operations, which makes a great restriction of flexibility for an electrical connection to a moored ship

SUMMARY OF THE INVENTION

An object of the present invention is to provide a flexible power supply system for supplying electric power from an AC power source to a ship moored at a berth of a quay and the system is adjusted to space constrains at the quay.

This object is achieved by a system for supplying electric power from an AC power source (AC-PS-1) to ships, each of the ships being moored at a respective berth of a quay.

Such a system comprises a rectifier, having an AC and a DC side, for converting AC electric power from the AC power source to a DC power, the AC side arranged to be connected to the AC power source, and a plurality of ship connection arrangements for supplying electric power to a respective ship, each of the ship connection arrangements placed at one of the berths and comprising an inverter configurable to output AC power at a first or a second frequency and a ship connector for connecting the ship. The system further comprises a DC distribution network connected to the DC side of the rectifier and the rectifier is placed at a distance from the quay and each of the inverters is connected to the DC distribution network.

The inventive system layout requires a relatively small space at each berth. The rectifier does not need to be positioned on each berth of the quay, but may be placed at a central location, for example outside a main ship loading area. This means that a considerable amount of the equipment is placed elsewhere, and may be placed far away from the terminals, where there is more space available. Due to the fact that the rectifier is centrally placed at a distance away from the berth area of the quay and a DC distribution network is adapted to distribute power down to each berth, the invention solves the problem of flexibility in supplying the ships at a quay with limited addition of equipment at the quay due to space constraints. Therefore, loading, handling and unloading of goods from a container will not be interfered.

With an inverter arranged in each ship connection arrangement, the system makes it possible to provide a ship with a selectable frequency.

According to the invention, a multi-terminal DC distribution network is arranged to distribute converted DC power down to the berths. The invention provides a system that makes it possible to connect to several AC power sources with different voltage and power capability to the DC distribution system via the respective rectifiers. For example, beside a main power grid, a local wind power source may be connected to the DC distribution network via a second rectifier. In this way, a modularity of the system is achieved.

According to an embodiment of the invention, the DC distribution network is adapted to distribute power at a voltage level higher than 1 kV to achieve an efficient power distribution. The advantage with a high-voltage DC distribution is that it reduces power losses. With a high-voltage connection, the same amount of power with fewer cables is enabled, which makes it easier during the connection process. For example, a high-voltage cable makes it possible to transfer 25 times more power than with a normal 400-volt cable of the same dimension. Therefore, an efficient power distribution is achieved. The DC grid also enables an electromagnetic field free environment.

The DC distribution network further comprises a DC distribution grid including cables, cable connections to the rectifier(s) and inverters and DC circuit breakers or switches. An advantage with the DC distribution grid is that it is possible to additionally reduce the cable losses. However, a simple DC busbar may be also applicable for distributing the DC power According to an embodiment of the invention, the rectifier is either a uni-directional or a bi-directional rectifier. The advantage with a bidirectional rectifier is that a reactive power can be adjusted to requirements of the main power grid to achieve a desired power factor.

Since no standard voltage level exists for ships, each of the ship connection arrangements comprises a transformer arranged between the ship connector and the respective inverter of the ship connection arrangement. The transformer is configurable to provide outputs at, at least, two voltage levels, for example 6 kV and 11 kV. In this way, both the frequency and the voltage level can be selected independently at each of the quay berths, so that a respective ship can be supplied with an appropriate electrical power.

It is an advantage that a transformer is provided in each ship connection arrangement positioned at each of berths, because it allows an even higher voltage in the distribution network to the berths and therefore additionally reduces power loss.

According to an embodiment of the invention, each of the ship connection arrangements further comprises a controller for controlling a respective inverter. Each of the controllers comprises means for receiving power requirements for each ship and for controlling the inverter to supply power to respective ship in accordance with the power requirements of that ship. It shall be understood that the power requirements include a voltage level required by the ship and/or a frequency value for the electrical equipment onboard the ship.

According to an embodiment of the invention, an energy storage is connected, through an interface, to the DC distribution network. The interface enables connection and disconnection of the energy storage to the DC distribution network.

According to an embodiment of the invention, the system further comprises a second rectifier connected to a second AC power source and a master controller comprising input means for receiving power requirements for each ship, input means for receiving available power supply for each of the AC power sources, a power flow management mechanism for determining active power needed from each of the rectifiers in order to balance the power requirements for the ships and for providing a power flow coordination, and for determining a set of reference values for the rectifiers connected to the AC power sources and for the inverters based on the determined active power need and one or more optimizing criteria, and output means for transferring the set of reference values for active and reactive powers to the AC power sources and to the inverters.

In the case that an energy storage is connected to the DC distribution network, the master controller is preferably operatively connected to the interface and adapted to control the interface, so that the energy storage stores surplus energy and delivers when energy is needed for the supply of the ships.

BRIEF DESCRIPTION OF THE DRAWINGS

The invention will now be explained more closely by the description of the different embodiments of the invention and with reference to the appended figures.

DETAILED DESCRIPTION OF THE INVENTION

Figure 1:
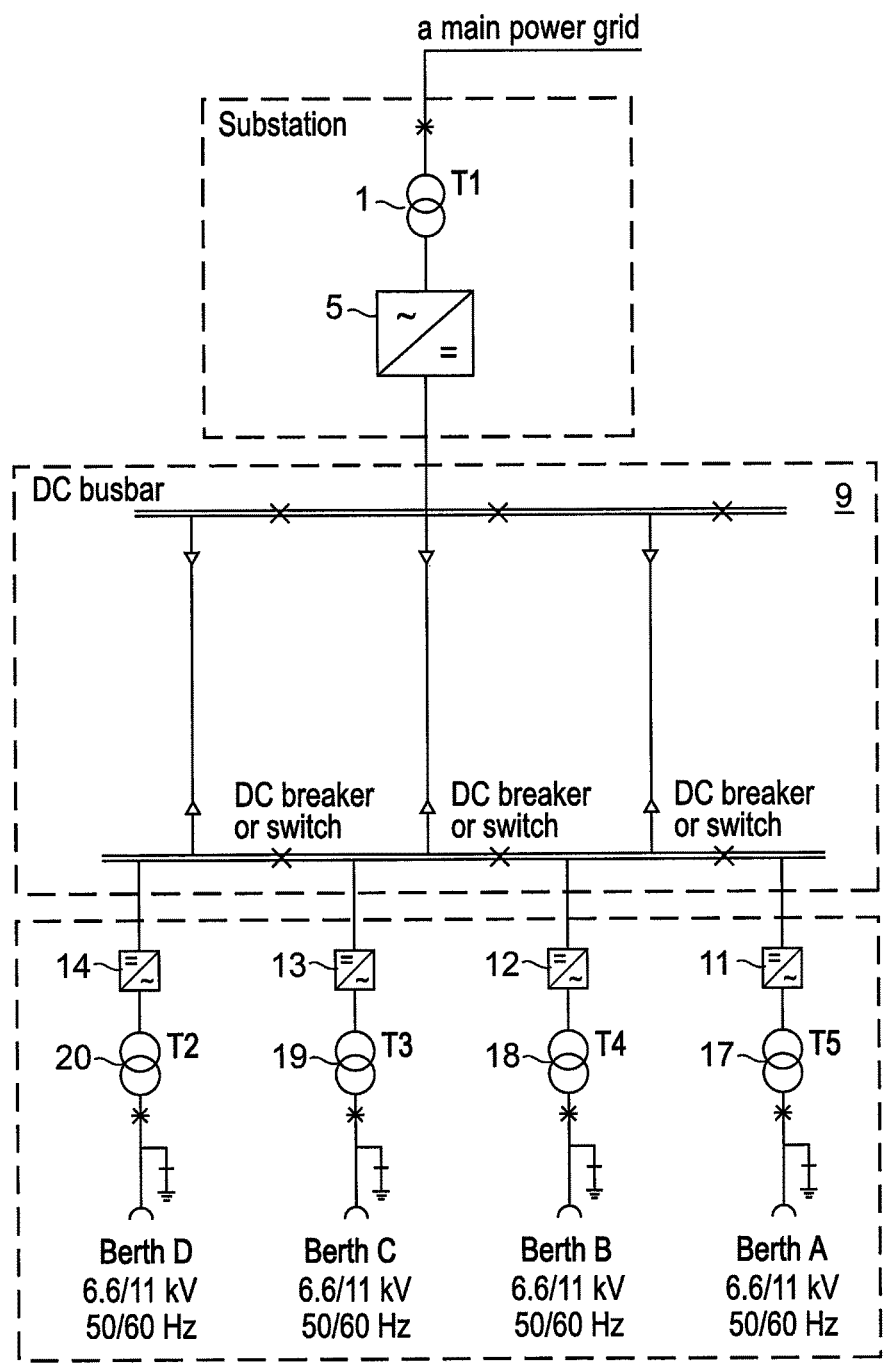
FIG. 1 shows a configuration of a system according to one embodiment of the invention, wherein a rectifier is connected to a AC power source and centrally placed at a place with a distance from a quay, a DC distribution grid being connected to transmit a converted DC power down to the berths of the quay and several ship connection arrangements being adapted to convert the DC power in accordance with the power requirements of a ship.

FIG. 1 shows a first configuration of a system comprising an AC power source, a rectifier 5 having a AC side and a DC side and a DC distribution network 9 and four sets of ship connection arrangements.

In this example, the AC power source is a main power grid with a frequency of either 50 Hz or 60 Hz. The rectifier 5 is provided with a grid connection, which further comprises a transformer 1 with its input side connected to the main power grid. The AC side of the rectifier 5 is connected to the output side of the transformer 1. The transformer and rectifier are selected together to provide an efficient transformation and rectification of the power supplied at the grid connection into a DC voltage level, preferably with a level higher than 1 kV, to reduce power loss during transmission. The DC side of the rectifier is connected to the DC distribution network exemplified as a DC distribution grid 9, to deliver the converted DC power to ships. The DC distribution grid 9 includes DC busbars, cables and switching apparatuses such as DC breakers and/or switches, not labeled in the figure. The switching apparatuses are adapted for protecting the DC grid by disconnecting and/or isolating loads in case of a fault.

Down to the berth area, four set of ship connection arrangements are provided at each quay berth A-D, each including an inverter 11-14, a transformer 17-20 and a ship connector, not shown in the figure. Each of the inverters is adapted to deliver power at a selectable frequency, for example, 50 or 60 Hz to a ship, while each of transformers 17-20 is dimensioned for a voltage level suitable for a ship connected to this ship connection arrangement and of a chosen type suitable for transforming the selected frequency. Such a voltage level is in the range of 5-25 kV. In this embodiment, each of the transformers 17-20 is arranged as the last link between the electric grid at shore and the electric system on the ship to form a galvanic separation between the grids. With such an arrangement, it is possible to reduce fault current, and a potential fault onboard, a vessel will not have an effect on a nearby connected vessel, so that the propagation of the fault is prevented.

Figure 3:
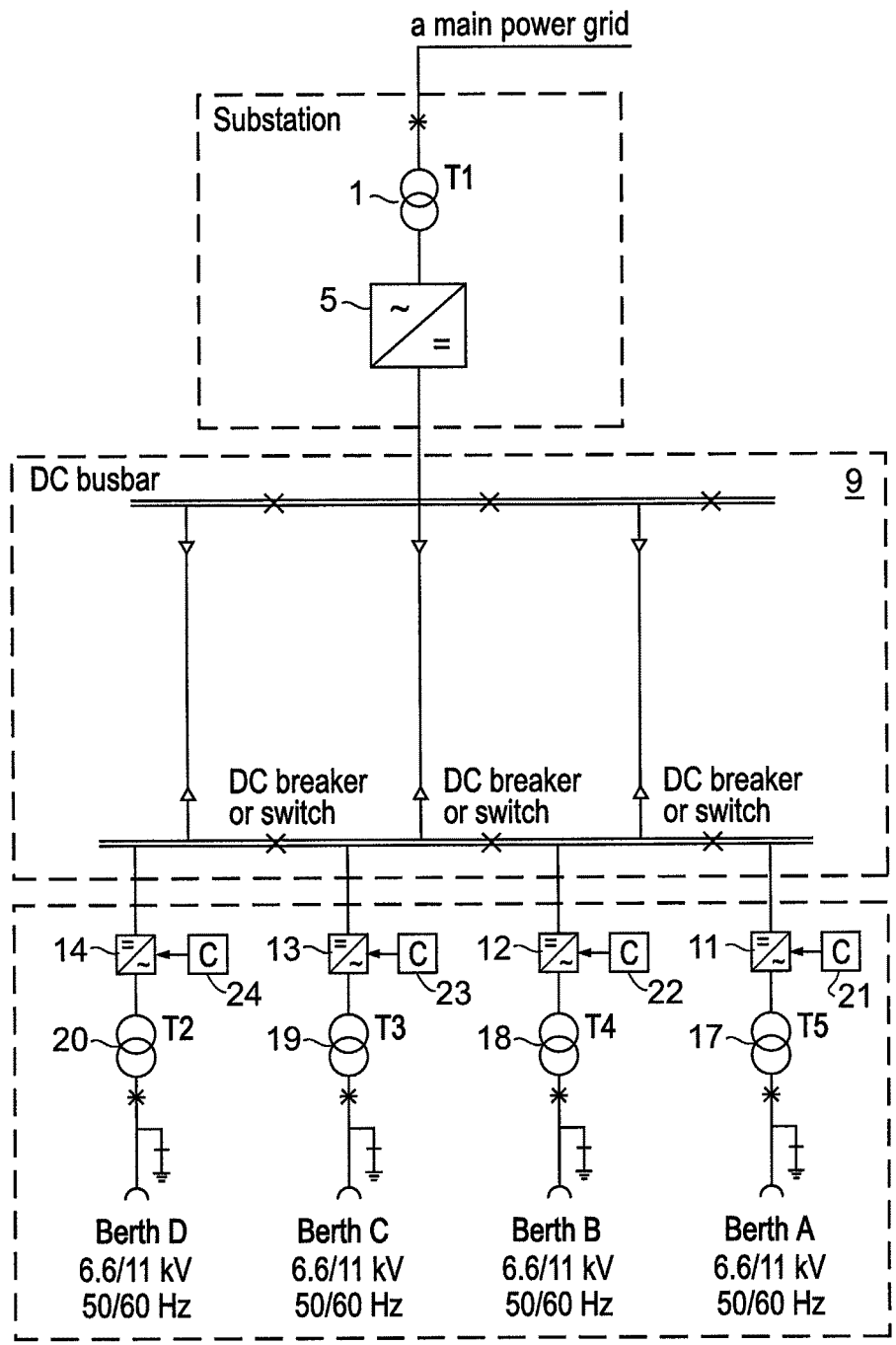
FIG. 3 shows a third configuration of a system according to a third embodiment of the invention, wherein each of the ship connection arrangements illustrated in FIG. 1 further comprises a controller.

To each of the inverters, a local controller 21-24 can be arranged for receiving power requirements from a ship, such as frequency and voltage level and for controlling the inverter to supply power in accordance with the power requirements as shown in FIG. 3.

Figure 2:
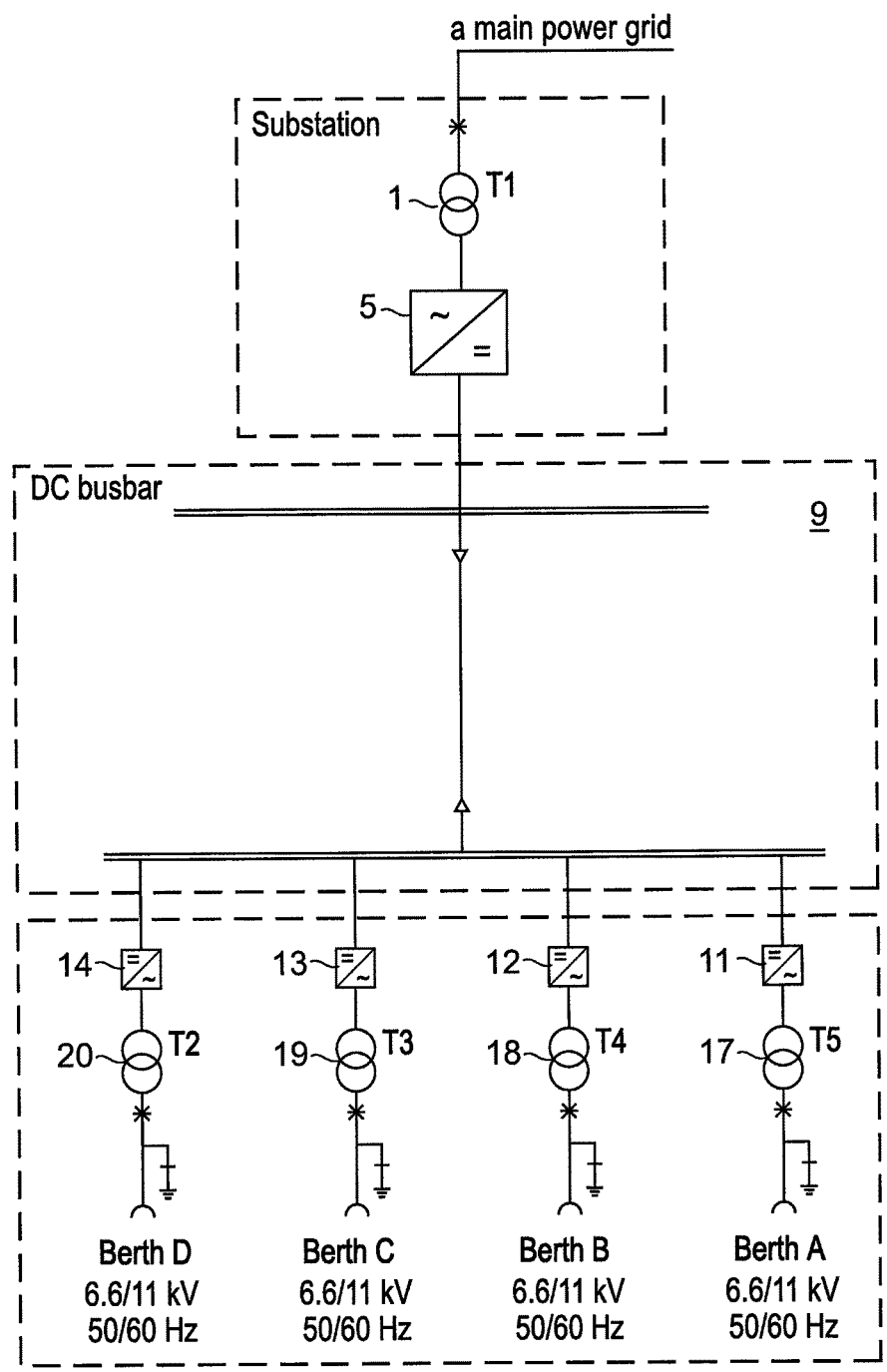
FIG. 2 shows another configuration of a system according to another embodiment of the invention, wherein a DC busbar is used for transmitting a converted DC power down to berths of the quay.

The DC distribution network may be a DC busbar for transferring DC power down to berth area of a quay, as shown in FIG. 2.

Figure 4:
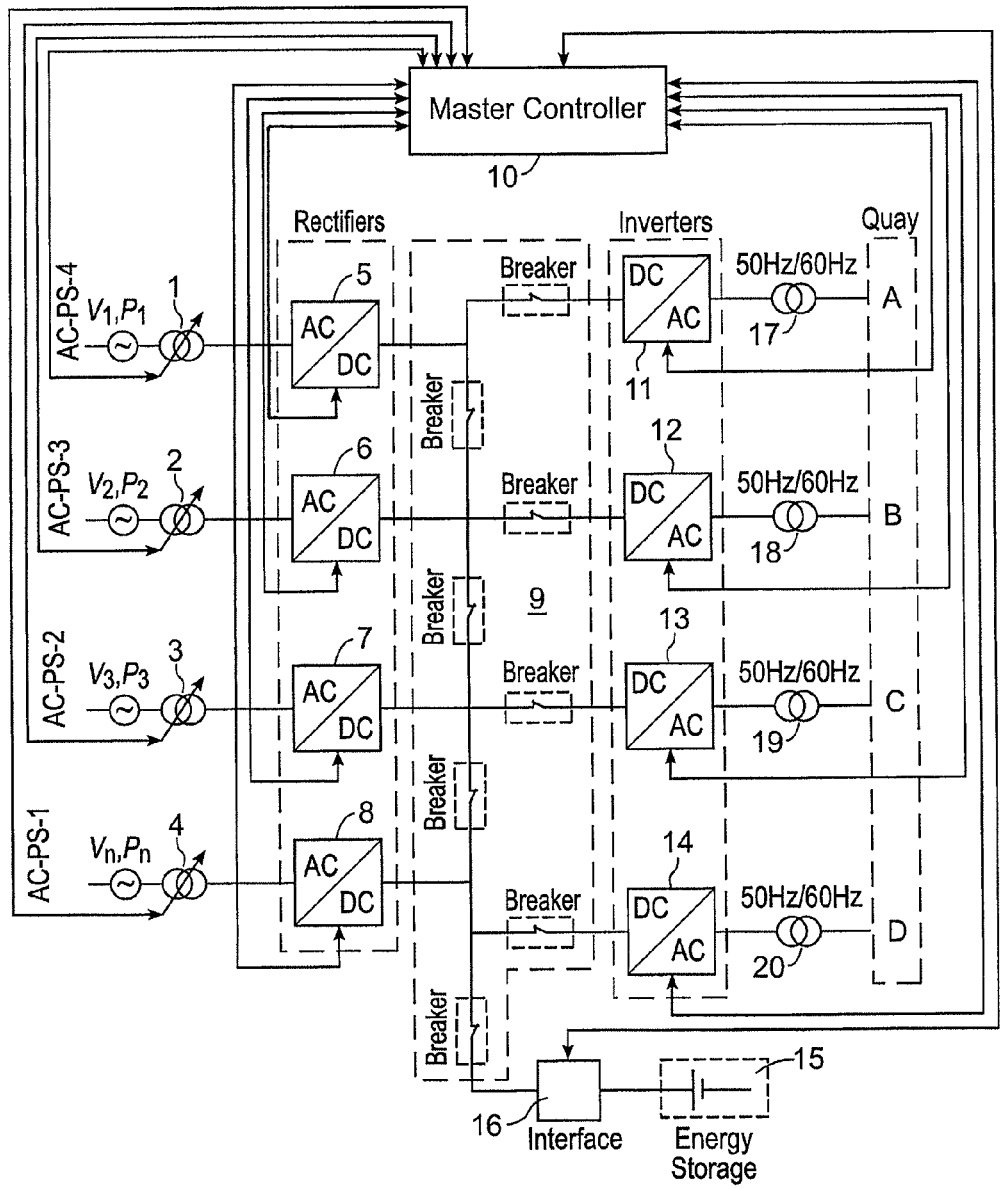
FIG. 4 shows a fourth configuration of a system according to yet another embodiment of the invention, wherein the system additionally comprises three rectifiers connected to other three AC power sources, a master controller adapted to coordinate power flow.

In FIG. 4, the fourth configuration is illustrated, which is an extension of the embodiment shown in FIG. 1. In this configuration, several grid connections are provided by the system in order to connect to several AC power sources (AC-PS-1, AC-PS-2, AC-PS-3, AC-PS-4) with different voltage levels and different power capacities. In this example. each of the grid connections includes a rectifier and a transformer for converting AC power to DC power. The AC power sources are decoupled from each other and from the load. In this example, the system further comprises a master controller 10 and an energy storage 15 connected to the DC distribution grid 9 via an interface 16.

As illustrated, the master controller 10 is operatively connected to the AC power source connection points, at the transformers 1-4, to the rectifiers 5-8 and to the inverters 11-14. The master controller 10 is also operatively connected to an interface 16 of an energy storage 15, exemplified as a battery energy storage. The master controller 10 is adapted to monitor the power flow in the DC distribution grid 9 by monitoring the energy storage interface 16, the AC grid connecting arrangements 1-8 and the inverters 11-14 that provide the AC supply to the ships and to coordinate the rectifiers and inverters, thus providing a power flow coordination depending on the load demand and the power capability of the AC power sources, as well as enabling a cost control if different AC power source providers are connected, so that a balance between active power between input and output is achieved as well as a balance of reactive power. It is also adapted for monitoring the operation of the system and provides system diagnostics, in case of a fault. It can also be adapted to control the charging and discharging of the battery energy storage, and can also control the on-load tap changer of the transformers to obtain coordinated voltage control (e.g. in case diode rectifiers are used). In this case the power requirements of a ship may be informed to the master controller instead of a respective local controller in order to supply power to the ship in accordance with the power requirements of the ship.

Also, if one of the rectifiers is a bi-directional rectifier, this bi-directional rectifier can be adapted to provide some reactive power compensation (within the limits of the converter current capability), making the system suitable to be connected to weak grids without additional means for reactive power compensation. Thus, a system wherein at least one rectifier is bidirectional is advantageous.

Having an energy storage which is connected via an interface to the DC grid provides the ability of the system to operate as a UPS (Uninterruptible Power Supply), by a suitable adaptation of the master controller, or alternatively a local controller at the interface. The energy storage can be adapted to increase the load ability and provide power "peak shaving" and compensate for voltage dips in the AC network. Moreover, it enables Island operation, and can surge for voltage stability in the ship supply.

If cranes are present in the harbour (e.g. container terminal), they can be connected to the same DC distribution network and regenerative braking can be carried out, thus sending the surplus power into the proposed DC grid, or energy storage, and resulting in increased energy efficiency for the harbour installation.

Some other advantages of the invention can be summarized as follows,

Using a DC distribution grid for the distribution of power from AC networks to the ship connection arrangements has several advantages, for example the AC grids are decoupled from the load, making the system robust against disturbances, and they are also decoupled from each other, so they are independent and the AC power sources can have varying and differing voltage levels. Moreover, only having an inverter and a transformer at the ship connections saves space since the grid connection for an AC power source can be located at a distance from the quay so as not to occupy valuable working areas, i.e. a transformer and rectifier is placed outside the quay area.

Using at least on bi-directional rectifier at an AC grid connection contributes to an intelligent system, so that power demand of the DC grid and/or power capability of the AC grid can be handled easier and more flexibly. Such rectifiers can be operated by the system as inverters and perform a power factor correction of the grid. The rectifiers can also be operated as inverters for performing active filtering of the harmonics of the respective AC grid.

Another advantage is that the electrification of the harbour can be carried out even if the grid connection point available is weak when using an active rectifier.

It shall be understood that the system described above is equally applicable to supply power at a frequency of 50 Hz and/or 60 Hz when the frequency of an AC power source is 50 Hz as well as when the frequency of an AC power source is 60 Hz.

The invention has mainly been described above with reference to a few embodiments. However, as is readily appreciated by a person skilled in the art, other embodiments than the ones disclosed above are equally possible within the scope of the invention, as defined by the appended patent claims.

A—A system for supplying electric power from a main power grid to a plurality of ships moored at a respective berth, said system comprising:
    a rectifier for converting AC electric power from the grid to direct current (DC),
    a DC grid connected to the DC output of said rectifier,
    a plurality of ship connection arrangements for power transfer to a respective ship,
    wherein each ship connection arrangement comprises an inverter having an input connected to the DC grid, said inverter being configurable to output AC power at a first frequency or a second frequency, each ship connection arrangement being arranged to supply said AC power to a respective ship.

B—The system according to clause A, comprising a plurality rectifiers for converting AC electric power from the grid to direct current (DC) to said DC grid.

C—The system according to clause A, wherein each ship connection arrangement comprises a transformer arranged between said inverter and a ship connector.

D—The system according to clauses A-C, wherein each transformer is provided with outputs at two voltage levels.

E—The system according to clauses A-D, including a controller for controlling the inverters.

F—The system according to clause E, wherein said controller comprises means for receiving power requirements for each ship, and for controlling the system to supply power to each ship in accordance with the power requirements of that ship.

G—The system according to clause F, wherein said power requirements include a voltage level.

H—The system according to clauses F or G, wherein said power requirements include a frequency.

I—The system according to any one of the preceding clauses A-H, wherein the inverters are controllable to achieve a desired reactive power in relation to said main power grid.

J—The system according to any one of clauses E to I, wherein each of said inverters receives data regarding the frequency of the output AC power from said controller.

K—The system according to any one of the preceding clauses, wherein each of said inverters receives data regarding the frequency of the output AC power from a respective controller at said ship connection arrangement.

A method for supplying electric power to a plurality of ships moored at a respective berth, the method comprising the steps of feeding electrical power from a main grid to a rectifier for converting AC electric power from the grid to direct current (DC) to a DC grid, converting DC power from said DC grid to AC power using a plurality of inverters, each inverter being located at a respective ship connection arrangement, each of said inverters being configurable to output AC power at a first frequency or a second frequency, in accordance with frequency requirements of a respective ship.

What is claimed is:

1. A system for supplying electric power from an AC power source to ships, each of the ships being moored at a respective berth of a quay, said system comprising:
 a rectifier, having an AC and a DC side, for converting AC electric power from the AC power source to a DC power, the AC side arranged to be connected to the AC power source, and
 a plurality of ship connection arrangements for supplying electric power to a respective ship, each of the ship connection arrangements placed at one of the berths and comprising an inverter configurable to output AC power at a first or a second frequency independently at each of the berths and a ship connector for connecting the ship, characterized in that the system further comprises a DC distribution network connected to the DC side of the rectifier and that the rectifier is placed at a distance from the quay and each of the inverters is connected to the DC distribution network.

2. The system according to claim 1, wherein the DC distribution network is adapted to distribute power at a voltage level higher than 1 kV.

3. The system according to claim 1, wherein said DC distribution network comprises a DC distribution grid.

4. The system according to claim 3, wherein the DC distribution grid includes cables, cable connections to the rectifier and the inverters and DC circuit breakers or switches.

5. The system according to claim 1, wherein said rectifier is uni-directional.

6. The system according to claim 1, wherein each of ship connection arrangements further comprises a transformer arranged between the ship connector and the inverter of the ship connection arrangement.

7. The system according to claim 6, wherein the transformer is adapted to provide outputs at least at two voltage levels.

8. The system according to claim 1, wherein each of the ship connection arrangements further comprises a controller for controlling a respective inverter.

9. The system according to claim 8, wherein each of said controllers comprises means for receiving power requirements for each ship and for controlling the inverter to supply power to the respective ship in accordance with the power requirements of the ship.

10. The system according to claim 9, wherein the power requirements include a voltage level.

11. The system according to claim 9, wherein the power requirements include a frequency.

12. The system according to claim 1, wherein an energy storage is connected, through an interface, to the DC distribution network.

13. The system according to claim 1, wherein said rectifier is bi-directional.

14. A system for supplying electric power from an AC power source to ships, each of the ships being moored at a respective berth of a quay, said system comprising:
 a rectifier, having an AC and a DC side, for converting AC electric power from the AC power source to a DC power, the AC side arranged to be connected to the AC power source, and
 a plurality of ship connection arrangements for supplying electric power to a respective ship, each of the ship connection arrangements placed at one of the berths and comprising an inverter configurable to output AC power at a first or a second frequency independently at each of the berths and a ship connector for connecting the ship, characterized in that the system further comprises a DC distribution network connected to the DC side of the rectifier, the rectifier being placed at a distance from the quay and each of the inverters being connected to the DC distribution network, at least a second rectifier connected to at least a second AC power source, and a master controller comprising:
  input means for receiving power requirements for each ship,
  input means for receiving available power supply for each of the AC power sources,
  a power flow management mechanism for determining active power needed from each of the rectifiers in order to balance the power requirements for the ships and for providing a power flow coordination, and for determining a set of reference values for the rectifiers connected to the AC power sources and for the inverters based on the determined active power need and one or more optimizing criteria, and
  output means for transferring the set of reference values for active and reactive powers to the AC power sources and to the inverters.

15. The system according to claim 14, wherein at least one of said rectifiers is bi-directional.

16. The system according to claim 14, wherein each of ship connection arrangements further comprises a transformer arranged between the ship connector and the inverter of the ship connection arrangement.

17. The system according to claim 16, wherein the transformer is adapted to provide outputs at least at two voltage levels.

18. The system according to claim 16, wherein the master controller is connected to said rectifiers, inverters, and transformers, said master controller monitoring power flow in the DC distribution network.

19. The system according to claim 14, wherein an energy storage is connected, through an interface, to the DC distribution network.

20. The system according to claim 19, wherein the master controller is connected to said interface to monitor said energy storage.

* * * * *